Feb. 4, 1958      L. A. CUMMARO      2,822,014
INSERT FOR SOFT MATERIALS AND TANG LOCKING MEMBER THEREFOR
Filed Aug. 10, 1953
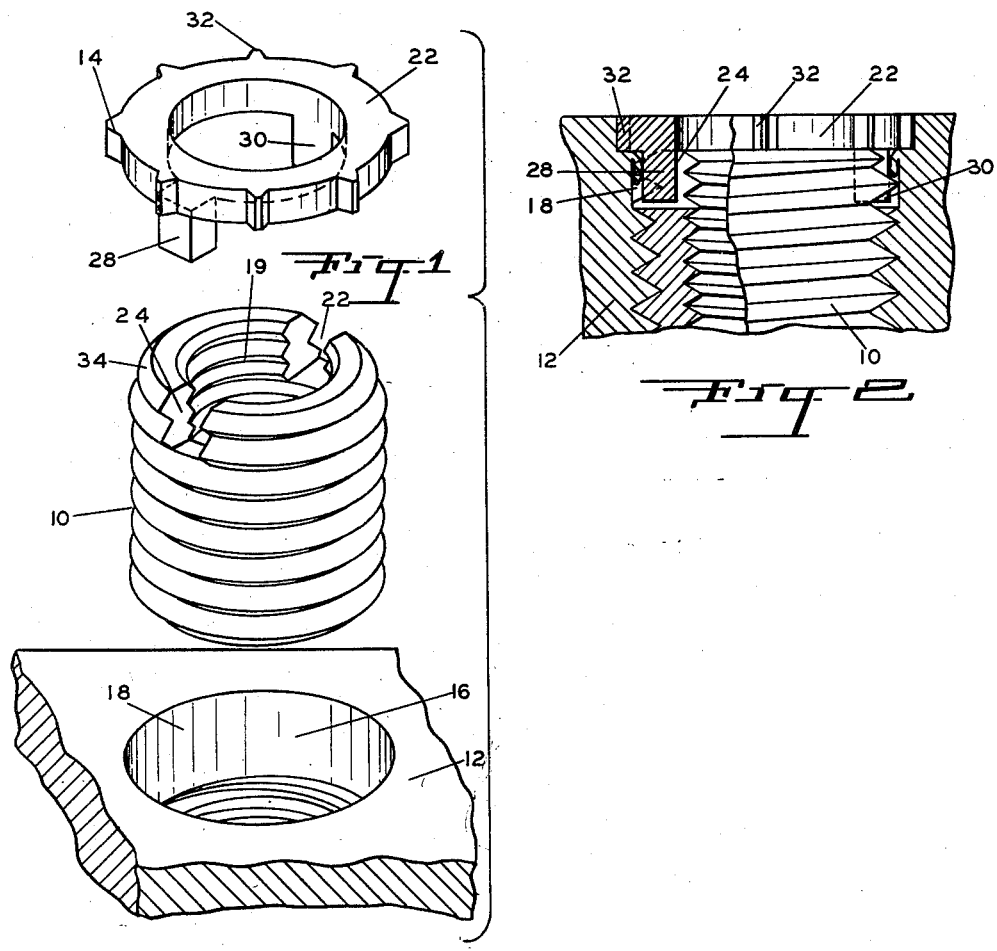
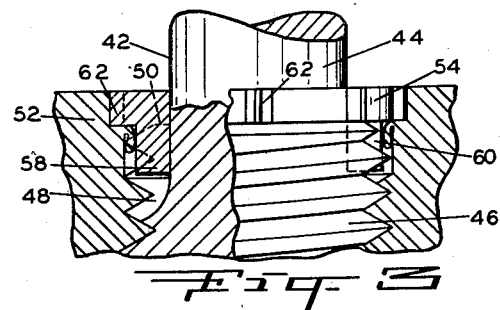
INVENTOR.
LOUIS A. CUMMARO
BY
Buckhorn and Cheatham
ATTORNEY

United States Patent Office 2,822,014
Patented Feb. 4, 1958

2,822,014

INSERT FOR SOFT MATERIALS AND TANG LOCKING MEMBER THEREFOR

Louis A. Cummaro, Bronxville, N. Y., assignor to Phillips Screw Company, New York, N. Y., a corporation of Delaware Application August 10, 1953, Serial No. 373,322

4 Claims. (Cl. 151—41.73)

The present invention relates to means for providing anchors for fastening elements in bodies of soft material, and more particularly to inserts adapted for installation in a body of soft material and a locking member therefor.

Because of their light weight and other desirable properties, many soft materials such as aluminum and magnesium alloys, plastics and various ply materials are being used extensively today in the construction of various items. The softness of these materials is a disadvantage, however, when a bolted or screwed connection must be made thereto since tapped holes in such material are easily stripped or galled or otherwise damaged upon installation or removal of a screw or bolt. It has been customary, therefore, to install an anchor of a suitable material, called an "insert," in the body of soft material and to which a threaded connection may be made without fear of damaging or galling threads in the parent body. The insert devices heretofore provided are complicated in structure and expensive to manufacture. Moreover, they are difficult to install or to remove once installed.

It is an object of the invention to provide a new and improved insert device that may be easily and quickly installed in a parent body of soft material.

It is another object of the invention to provide a new and improved anchoring inset that may be easily and cheaply manufactured.

Other objects and advantages of the invention will become apparent hereinafter.

In accordance with the present invention, an insert member is provided having external screw threads adapted to fit the threads of an aperture formed in a parent body. A cooperative locking member is provided for the insert, including a ring portion adapted to be mounted in the body aperture coaxially with the insert, the insert and locking member having cooperating tang and notch means formed on their adjacent portions whereby the locking member and insert are locked against relative rotation. The locking member is also provided with tooth means adapted to groove the walls of the body aperture whereby the entire assembly is locked against rotation relative to the parent body.

For a more detailed description of the invention, reference is made to the accompanying drawings and explanation thereof. In the drawings, Fig. 1 is an exploded perspective view showing an insert of the invention, a locking ring therefor, and the aperture in the body in which the insert and locking member are received;

Fig. 2 is a fragmentary side elevation of an insert and locking member of the type shown in Fig. 1, in place in a parent body, a portion of the locking member and insert being shown in longitudinal, medial section; and Fig. 3 is a fragmentary side elevation of an insert formed with an integral stud and showing the same installed in a parent body with the locking member of the type shown in Fig. 1, a portion of the insert and locking member being shown in medial, longitudinal section.

Referring now to the drawings, in Figs. 1 and 2 is shown an insert 10, preferably formed of a relatively hard metal, such as, for example, steel, bronze, brass or like metals, or other suitable material, and adapted to be installed in a parent body 12 of a relatively soft material, such as, for example, aluminum, magnesium or an alloy thereof, so as to provide an anchor in such body, the insert 10 being adapted to be locked in the body 12 by a locking member indicated generally by the reference numeral 14. The insert 10 is of general tubular form and is provided with external threads throughout its length adapted to fit cooperatively the threads of a screw-threaded bore or aperture 16 formed in the parent body 12, which aperture 16 is formed with a thread-relieved or counterbore 18 of predetermined depth, determined as will be later explained. The insert 10 is adapted to be threaded into the aperture 16 until the upper or outer end 20 of the insert is spaced a predetermined distance below the surface of the body 12, as will also be explained. The insert 10 is shown as having a central screw-threaded aperture 19, adapted to receive a screw-threaded stud or other fastening member which it is desired to anchor in the parent body 12.

The locking member 14 comprises a ring portion 22 adapted to be received within the counterbore 18 above the insert 10, and, as will now be apparent, the insert 10 is preferably screwed into the parent body 10 until the outer end 20 thereof is spaced below the surface of the body a distance substantially equal to the height or axial length of the ring portion 22. The outer diameter of the ring portion 22 is preferably substantially equal to the diameter of the counterbore 18, while the diameter of the ring aperture is preferably of slightly greater diameter than the root diameter of the internal insert threads 19, whereby the stud or fastening member to be engaged in said threads may pass freely through the ring.

Interengaging means are provided upon the adjacent ends of the locking member ring portion 22 and insert 10 to prevent relative rotation therebetween. Formed in the outer end 20 of the insert is a transverse recess whereby the wall of the insert is formed with diametrically opposite end slots or notches 24, 26. Projecting from the lower end of the ring portion 22 are a pair of oppositely disposed, elongate prongs or tangs 28, 30 adapted to engage cooperatively one in each of the notches 24, 26 upon mounting of the locking member in the counterbore 18. Preferably the tangs 28, 30 are substantially longer than the axial length of the ring portion 22, and the notches 24, 26 are of a depth approximately equal to the length of the tangs 28, 30, and preferably of slightly greater depth, so that the ring portion 22 seats snugly against the upper end 20 of the insert. The transverse recess 24, 26 in the insert also provides a slot in which a tool may be engaged to install the insert.

The outer periphery of the locking member ring portion 22 is provided with means to engage the parent body 12 so as to prevent rotation of the locking member relative to the parent body. These locking means comprise a plurality of radially spaced teeth 32 adapted to groove the side walls of the counterbore 18 upon pressing of the ring portion 22 into the counterbore. Preferably the teeth 32 are, as shown, of such substantial size as to preclude shearing thereof upon the application of torsional stress to the locking member, and also so as to assure secure engagement of the locking member with the parent body.

As is evident from Fig. 2, the teeth 32 cut a chip from the parent body, and preferably the insert 10 is provided with a generous chamfer 34 at its upper end to provide clearance space for the chips. Also, the tangs 28, 30 are preferably set in a slight distance from the outer periphery of the lock of the ring portion 22 so as to provide a clearance space for the chip cut by the tooth immediately adjacent the tang.

The previously expressed preferred length of the tangs 28, 30 is desired so that the tangs will engage in the notches 24, 26 prior to the engagement of the teeth 32 with the surface of the body 12 since alignment of the notches and tangs will thereby be assured. Preferably also the counterbore 18 is drilled to a depth slightly greater than the total penetration of the tangs 28, 30 so as to provide a free path for the tangs that would otherwise intercept at least a portion of the threads of the parent body as the locking member was forced into position.

As is evident, the inner engagement of the tangs 28, 30 with the notches 24, 26 of the insert prevent relative rotational movement between the insert 10 and locking member 14. The engagement of the locking member teeth 32 in the body 10, on the other hand, prevents rotational movement of the locking member relative to the parent body whereby the insert 10 is effectively restrained against torsional displacement. The engagement of the threads of the insert 10 with the threads of the parent body will, of course, prevent longitudinal displacement of the insert after it is installed in position in a parent body.

Referring now to Fig. 3, a fragmentary portion of an insert indicated generally by the numeral 42 is shown, being solid rather than tubular, and being provided with an integral shank or stud 44 projecting from an externally threaded portion 46. The stud 44 is of lesser diameter than the root diameter of the threaded portion 46, and said threaded portion is provided with a pair of longitudinally extending, diametrically oppositely positioned slots or notches 48 which open through the shoulder 50 defined by the threaded portion 46 and stud 44.

The insert 42 is shown as installed in a threaded, counterbored aperture of a parent body 52 with a locking member 54 substantially similar to the locking member shown in Fig. 1 positioned to secure the insert against relative rotation. The locking member 54 comprises a ring portion having a central aperture through which the insert stud 44 projects and is provided with a pair of oppositely disposed tangs 58, 60 extending from the ring and adapted to fit cooperatively within the opposite notches 48 of the insert, the locking member 54 having teeth 62 adapted to project into the parent body to lock the insert against relative rotation, all as described hereinbefore.

Removal of an insert of the invention from a body is accomplished in a relatively simple manner. Referring to Fig. 2, for example, the locking member 14 and insert 10 are drilled from the surface thereof to the bottom ends of the tangs 28, 30 with a drill having a diameter substantially equal to the diameter of the ring portion 22. The entire locking member, with the exception of the teeth 32, is thus drilled out, permitting removal of the remaining portion of the insert by means of an "easy-out" tool. The teeth 32 may be left embedded in the parent body or may be easily pried out, as desired.

A new insert and locking member may be replaced in the former aperture or the aperture enlarged for installation of an insert of larger size.

Having illustrated and described preferred embodiments of the invention, it should be apparent to those skilled in the art that the invention permits of modification in arrangements and details. I claim as my invention all such modifications as come within the true spirit and scope of the appended claims.

I claim:
1. The combination comprising an externally threaded tubular insert adapted for mounting in a cooperatively threaded aperture in a parent body, said insert having a pair of diametrically disposed slots formed in one end thereof adapted to receive a tool for driving said insert into said aperture, said insert being adapted to be wholly disposed within said body and with said one end spaced a predetermined distance inwardly of the surface of said body, and a lock ring receivable in said aperture above said insert and coaxially of said insert, said lock ring having an inner end surface and having a pair of tangs projecting from said inner end surface adapted to engage cooperatively within said slots whereby to lock said ring and insert against relative rotation, and tooth means on said locking member adapted to cut into said parent material and lock the ring against rotation relative to said parent material.

2. The combination comprising an insert for installation in a threaded, counterbored opening in a parent body and a locking member for securing said insert against rotation relative to said parent body, said insert comprising an elongate threaded member having an inner and an outer end, said outer end having a plurality of radially spaced, axially extending slots in the outer edge thereof, said locking member comprising a ring portion having an outer diameter substantially equal to the diameter of said body opening counterbore and having inner and outer end surfaces and a plurality of tangs projecting from said inner end surface and adapted to fit cooperatively within said slots, said insert being adapted to be threaded inwardly of said parent body until said outer end is spaced inwardly of the surface of said parent body a distance substantially equal to the height of said ring portion, said ring portion having a plurality of locking teeth extending outwardly from the outer periphery thereof and adapted to cut into said parent material as said locking member is moved axially with respect to said insert to mesh said tangs and slots.

3. In an anchoring device for mounting in a parent body formed with a screw-threaded aperture thread-relieved from the surface of said body a predetermined distance, the combination comprising a screw-threaded insert member receivable in the threaded portion of said aperture and having a plurality of radially spaced notches in the outer end thereof, and a locking member including a ring portion receivable in the thread-relieved portion of said aperture, said locking member having a plurality of radially projecting teeth adapted to groove the side walls of said thread-relieved portion, and a plurality of tangs projecting from said ring portion and adapted to engage in said notches upon relative axial movement of said members, said tangs being of greater length than said teeth, said insert member being adapted to be installed in said aperture with the outer end thereof spaced below said surface a distance substantially equal to the axial height of said ring whereby said tangs engage in said notches prior to the engagement of said teeth with said parent body.

4. In an anchoring device for mounting in a parent body formed with a screw-threaded aperture thread-relieved from the surface of said body a predetermined distance, the combination comprising a cylindrical insert member provided with threads adapted to fit the screw threads of said aperture, said insert member having a plurality of radially spaced slots in the periphery of the threaded portion thereof, and a locking member including a ring portion receivable in the thread-relieved portion of said aperture, said locking member having a plurality of teeth projecting radially outwardly of said ring and adapted to groove the side walls of said thread-relieved portion, and a plurality of tang means projecting from the inner end of said ring portion and adapted to engage in said slots upon relative axial movement of said members, said tangs being of greater length than said teeth.

References Cited in the file of this patent

UNITED STATES PATENTS

| | | |
|---|---|---|
| 375,177 | McKinnon | Dec. 20, 1887 |
| 580,340 | Buell | Apr. 6, 1897 |
| 697,416 | Sutherland | Apr. 8, 1902 |
| 1,030,146 | Wade | June 18, 1912 |
| 1,064,527 | Norris | June 10, 1913 |
| 1,755,807 | Boles | Apr. 22, 1930 |
| 2,358,783 | Best | Sept. 26, 1944 |
| 2,400,318 | Rosan | May 14, 1946 |
| 2,400,348 | Greene | May 14, 1946 |

OTHER REFERENCES

Ser. No. 382,653, K. Ozuka (A. P. C.), published May 11, 1943.